United States Patent [19]

Denis et al.

[11] Patent Number: 4,730,678
[45] Date of Patent: Mar. 15, 1988

[54] HEAVY-DUTY TRIP MECHANISM FOR GROUND WORKING IMPLEMENTS

[76] Inventors: Phillipe F. Denis; Bernard Denis, both of P.O. Box 250, Vonda, Saskatchewan, Canada

[21] Appl. No.: 837,297

[22] Filed: Mar. 7, 1986

[30] Foreign Application Priority Data

Dec. 3, 1982 [CA] Canada ................................. 416959

[51] Int. Cl.⁴ ............................................. A01B 61/04
[52] U.S. Cl. ..................................... 172/265; 172/705
[58] Field of Search ............... 172/265, 266, 267, 264, 172/263, 261, 269

[56] References Cited

U.S. PATENT DOCUMENTS

| 310,290 | 1/1885 | Lewis | 172/265 |
| 444,986 | 1/1981 | Bloominger | 172/265 |
| 2,775,183 | 12/1956 | Altgelt | 172/269 |
| 4,548,277 | 10/1985 | Dietrich | 172/265 |

FOREIGN PATENT DOCUMENTS 647375 8/1962 Canada ................................. 172/264

Primary Examiner—Richard J. Johnson
Attorney, Agent, or Firm—Stanley G. Ade; Murray E. Thrift

[57] ABSTRACT

Normally, spring loaded trip mechanisms increase in resistance and pressure as they move rearwardly. This device includes a swing arm above the shank with a roller engaging the upper surface of the shank. The tension springs extend from the swing arm to the upper end of the shank arm near the pivot thereof to the frame and are adjustable so that the initial tripping pressure may be set. Once this pressure is reached, the shank and arm move rearwardly causing the roller and swing arm also to be forced rearwardly thereby extending the springs. The geometry of the swing arm and springs, together with the shank is such that once the tripping pressure is reached and the shank commences to move rearwardly, the resistance drops rapidly instead of increasing thus letting the arm clear the object without any increase of contact force. Once cleared, the springs return the shank to the working position.

5 Claims, 3 Drawing Figures

HEAVY-DUTY TRIP MECHANISM FOR GROUND WORKING IMPLEMENTS

BACKGROUND OF THE INVENTION

This invention relates to new and useful improvements in trip mechanisms for ground working implements, and is particularly suitable for use with heavy-duty cultivators although it is not restricted to such use.

Conventionally, the cultivator or ground working implement trip mechanisms are controlled by tension or compression springs, the force of which increases once the arm has commenced to trip thus increasing the resistance against the object which caused the tripping.

It is obviously desirable that once the tripping pressure has been reached and the shank commences tripping, that the shank clear the object immediately and returns to the working position. This prevents strain and/or damage occurring to the mechanism which usually has to be made considerably stronger than required for normal use. Furthermore, if objects such as roots, stones and the like are prevalent in the soil being worked, considerable additional power is required to operate the ground working implement.

SUMMARY OF THE INVENTION

The present invention overcomes these disadvantages by providing a trip mechanism in which once the tripping pressure has been reached, releases the shank and reduces the spring tension thereon so that it can clear the object and return to the working position with the minimum of strain and/or damage occurring to the structure.

In accordance with the invention there is provided, in a ground working implement that includes a ground working tool on the lower end of the shank, said shank including an upper, substantially horizontal portion and being pivotally secured to the implement frame and depending downwardly therefrom and being movable from a ground working position into a tripped position and vice versa; a tripping mechanism for said shank, said tripping mechanism comprising in combination at least one tension spring, means mounting said tension spring by one end thereof to said shank adjacent the pivotal connection thereof to the implement frame and swing arm means pivotally connected by one end thereof to the implement frame and being movably engagable upon the upper surface of the substantially horizontal portion of said shank, by the other end thereof, said tension spring being connected by the other end thereof to said swing arm means intermediate the ends thereof, the geometry of said swing arm means, said spring and said shank reducing the resistance and pressure exerted by said spring upon said shank once said shank has tripped and is moving rearwardly from the working position.

In accordance with another aspect of the invention, there is provided a shank tripping mechanism for ground working implements which include a frame, a least one implement shank assembly including a shank pivotally mounted to said frame and ground working means on the distal end thereof, said shank tripping mechanism comprising in combination at least one tension spring, means mounting said tension spring by one end thereof to said shank adjacent the pivotal connection thereof to the implement frame and swing arm means pivoted by one end thereof to the implement frame and movably engaging the upper surface of said substantially horizontal portion of said shank, by the other end thereof, said tension spring being connected by the other end thereof to said swing arm means intermediate the ends thereof, the geometry of said swing arm means, said spring and said shank reducing the resistance and pressure exerted by said spring upon said shank once said shank has tripped and is moving rearwardly from the working position, and means adjusting the effective tripping release force of said shank, within limits.

A further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
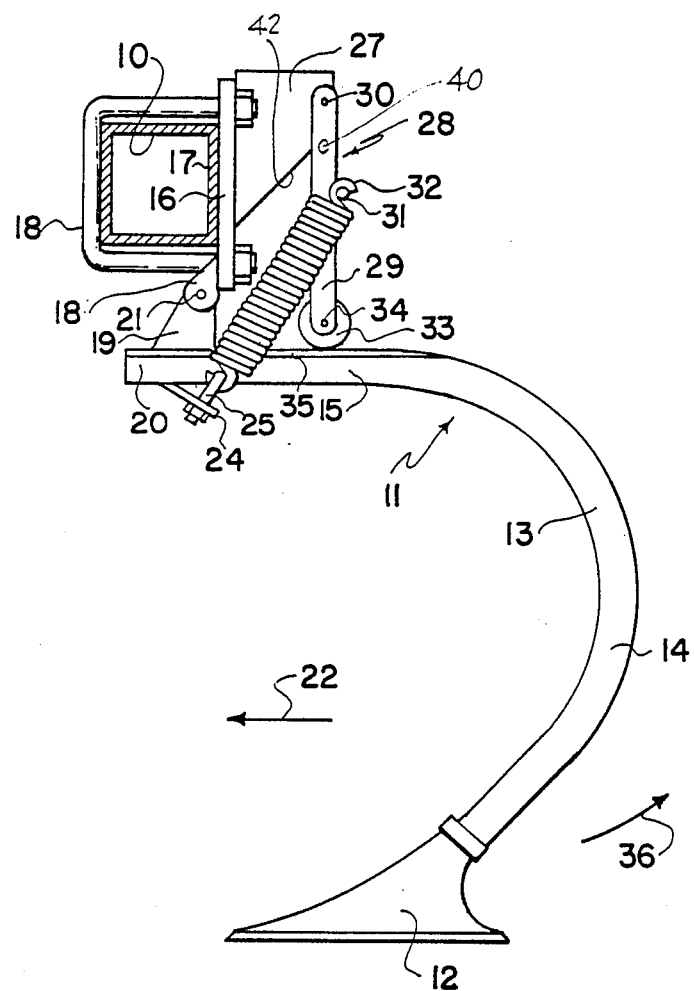
FIG. 1 is a side elevation of the trip mechanism in the ground working position.

Proceeding therefore to describe the invention in detail, reference character 10 illustrates a cross member of the frame of the implement such as a cultivator with a shank assembly collectively designated 11 connected thereto.

The shank normally includes a ground working implement such as a shovel 12 secured to the lower end of a shank arm 13 which includes the curved main portion 14 and the substantially horizontal upper end portion 15 all of which is conventional.

A vertically situated mounting bracket or plate 16 is secured to the rear vertical side 17 of the frame 10 by means of U-bolts and nuts 18 which extend around the frame member and through the plate, being secured as clearly shown.

A shank pivot bracket 18A extends forwardly and downwardly from adjacent the lower side of the bracket 16 and a mounting lug 19 is formed on and extends upwardly from the horizontal portion 15 of the shank, adjacent the rear end 20 thereof. A pivot pin 21 extends through the shank pivot bracket and the lug thereby pivotally mounting the shank assembly which normally moves in the direction of arrow 22 when in the ground working position shown in FIG. 1.

Figure 3:
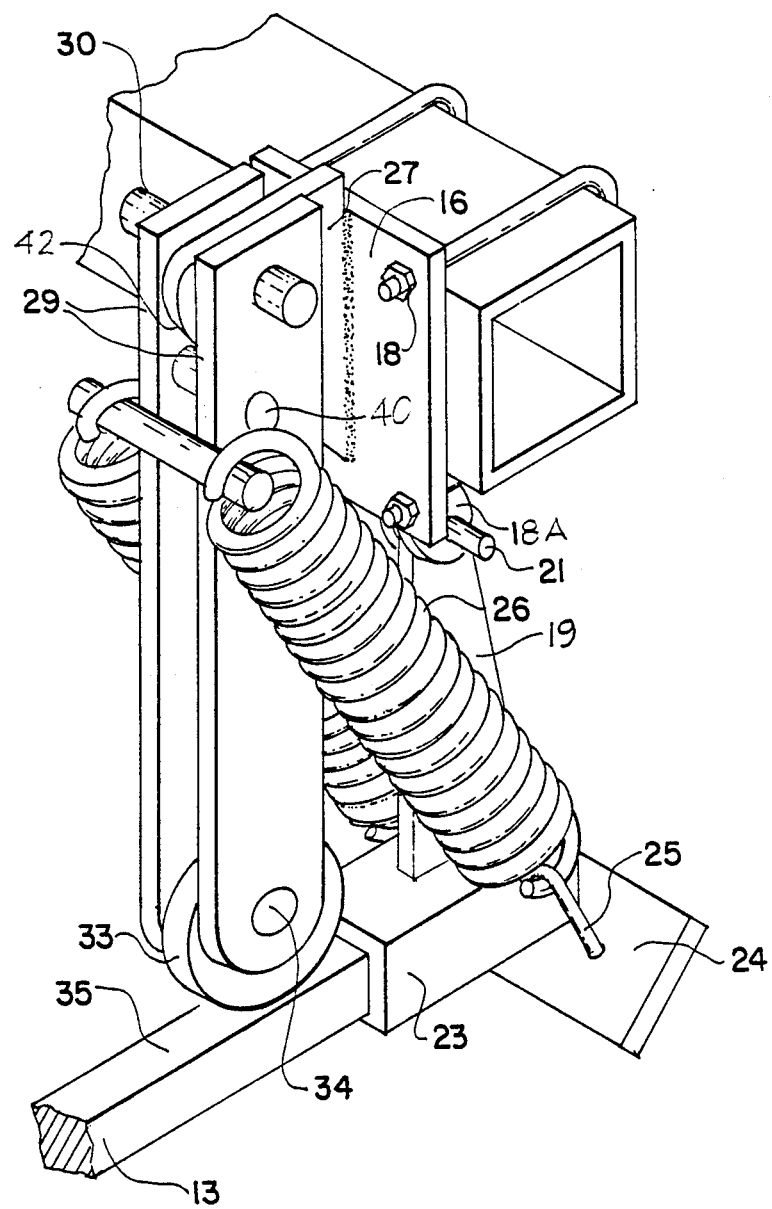
FIG. 3 is a fragmentary rear isometric view of the trip mechanism.

Alternatively, the horizontal portion of the shank arm may engage within a sleeve 23 shown in FIG. 3 and may be secured thereto. Under these circumstances the lug 19 extends from the rear of the sleeve as clearly illustrated with the pivot pin once again mounting the assembly to the mounting bracket 16.

A spring anchor plate 24 may extend downwardly and rearwardly from adjacent the underside of the end 20 of the shank or, alternatively, downwardly and rearwardly from the rear of the sleeve 23 and spring adjusting bolt assemblies 25 engage apertures within this anchor plate as clearly shown. At least one tension spring 26 is anchored to plate 24 for controlling the tripping action of the shank assembly. In the present embodiment, a pair of such tension springs are provided one upon each side of the shank arm and these extend upwardly and rearwardly from the spring adjusting bolts 25 with the effective contact point being adjacent to or slightly forward of the pivot 21.

A main trip bracket 27 extends rearwardly of the mounting bracket 16 and is triangular in configuration to strengthen same although other configurations can be utilized. Swing arm means collectively designated 28 are provided taking the form of a pair of links or arms 29 pivotally secured adjacent the upper ends thereof by means of a pivot pin 30, one upon each side of the rearward end of the main trip bracket 27. These swing arms normally depend downwardly from the pivot 30 in a substantially vertical position when the shank assembly 11 is in the working position shown in FIG. 1. The movement of the swing arms 29 towards the front, that is the left as seen in FIG. 1, is limited by a rod 40 that extends between the arms and engages the back force 42 of main trip bracket 27. The rod 40 is positioned to prevent the arm 29 from swinging forwardly past the vertical position which would prevent the shank assembly 11 from tripping.

A spring anchor pin 31 is secured transversely across the swing arms 29 and extend outwardly upon each side thereof to receive the upper eye 32 of each of the springs one upon each side of the swing arms as clearly shown in FIG. 3.

A roller or similar anti-friction means 33 is journalled for rotation upon a pin 34 adjacent the lower ends of the swing arms 29 and is situated between these lower ends as clearly shown. This roller engages the upper surface 35 of the horizontal portion of the shank arm as clearly illustrated in the drawings.

By adjusting the position of the spring adjusting bolts 25, the trip pressure at the front of the ground implement 12 may be adjustable for example between 600 lb. and 900 lb. depending upon design parameters and the conditions under which the implement is operating.

Figure 2:
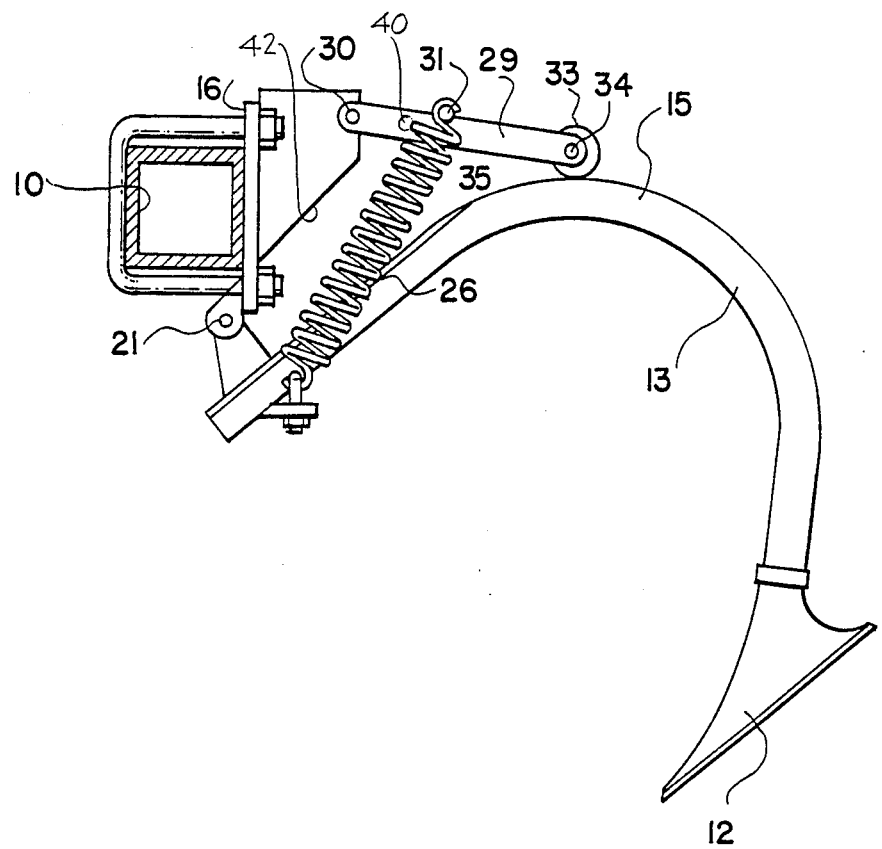
FIG. 2 is a view similar to FIG. 1 but showing the mechanism in the tripped position.

Once the preset pressure is reached and exceeded, the shank assembly commences to move rearwardly in the direction of arrow 36 with the tension springs 26 supplying this initial release pressure. This rearward movement causes the horizontal portion to pivot rearwardly in an arc around the pivot pin 21 thus forcing the roller 33 rearwardly together with the swing arms 29 thereby extending springs 26 but the movement of the swing arms in an arc in the direction of arrow 36 reduces the effective pressure of the springs upon the shank assembly. In other words the geometry of the arms 29, the springs 26 and the shank assembly 11 is such that as soon as the tripping pressure is exceeded, the effective pressure upon the shank assembly is reduced rapidly thus allowing it to swing upwardly and clear of the obstruction whereupon the tension springs immediately return the shank assembly to the working position. FIG. 2 snows the trip mechanism in the fully tripped position wherein the springs have actually extended to their fullest amount and then retracted thus reducing the spring pressure upon the shank assembly.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A shank tripping mechanism for ground working implements comprising in combination a frame, at least one implement shank assembly including a shank having a substantially planar horizontal portion pivotally mounted on said frame and ground working means on the distal end thereof, said shank tripping mechanism including at least one tension spring, means mounting said tension spring by one end thereof to said shank adjacent to and below the pivotal connection thereof to the implement frame and swing arm means pivoted by one end thereof to the implement frame and movably engaging the upper surface of said substantially horizontal planar portion of said shank, by the other end thereof, said tension spring being connected by the other end thereof to said swing arm means intermediate the ends thereof and means adjusting the effective tripping release force of said shank, within limits, said swing arm including an arm situated substantially vertical when said shank is in the working position and being pivotally connected at said one end thereof to said frame with the other end depending downwardly therefrom.

2. The shank tripping mechanism according to claim 1 in which said spring is mounted to said shank by said one end thereof, forwardly of the pivotal connection of said shank arm to said frame.

3. The shank tripping mechanism according to claim 1 in which said swing arm means includes a roller journalled for rotation upon the lower end thereof, said roller operatively engaging said upper surface of said substantially horizontal planar portion of said shank.

4. The shank tripping mechanism according to claim 2 in which said swing arm means includes a roller journalled for rotation upon the lower end thereof, said roller operatively engaging said upper surface of said substantially horizontal portion of said shank.

5. The shank tripping mechanism according to claim 1 which includes a substantially vertically situated mounting bracket secured to said frame, a shank pivot bracket extending from said mounting bracket, a lug extending from said shank adjacent the upper end thereof, a pivot pin pivoting said lug to said pivot bracket, and a main trip bracket extending rearwardly of said mounting bracket, said swing arm means being pivoted by said one end thereof to said main trip bracket rearwardly and above said pivot pin.

* * * * *